United States Patent [19]
Stewart

[11] Patent Number: 5,870,708
[45] Date of Patent: Feb. 9, 1999

[54] METHOD OF AND APPARATUS FOR SCANNING FOR AND REPLACING WORDS ON VIDEO CASSETTES

[75] Inventor: Walter Stephen Stewart, Canton, Ohio

[73] Assignee: Walter S. Stewart

[21] Appl. No.: 728,885

[22] Filed: Oct. 10, 1996

[51] Int. Cl.⁶ .................................................. G10L 3/02
[52] U.S. Cl. ........................... 704/275; 704/278; 369/54; 369/83; 348/632; 455/212
[58] Field of Search .................................... 704/278, 231, 704/270, 502, 257, 200, 235, 504, 260, 277, 275, 251; 369/83, 54; 348/462, 632; 455/212, 221

[56] References Cited

U.S. PATENT DOCUMENTS

| | | | |
|---|---|---|---|
| 4,768,108 | 8/1988 | Higurashi | 386/103 |
| 5,057,932 | 10/1991 | Lang | 386/101 |
| 5,162,905 | 11/1992 | Itoh et al. | 348/4 |
| 5,195,135 | 3/1993 | Palmer | 380/20 |
| 5,369,440 | 11/1994 | Sussman | 348/462 |
| 5,371,795 | 12/1994 | Vogel | 380/20 |
| 5,659,793 | 8/1997 | Escobar et al. | 345/302 |
| 5,697,079 | 12/1997 | Spivey | 455/212 |

*Primary Examiner*—David R. Hudspeth
*Assistant Examiner*—Donald L. Storm
*Attorney, Agent, or Firm*—Emerson & Associates; Roger D. Emerson; Mark E. Duell

[57] ABSTRACT

A scanning apparatus for scanning a video recording for objectionable content is disclosed that includes an audio processor for analyzing the recording and recognizing the objectionable audio, and audio control gate for manipulating the objectionable audio. The scanning apparatus also includes an amplifier that amplifies the signal and converters to convert the signal from analog to digital format prior to analysis and digital to analog format after analysis. The method of scanning the video recording for objectionable content includes the steps of analyzing the recording and manipulating the recording. The method first includes the steps of amplifying the recording signal, separating the audio portion of the recording from the composite recording, digitizing the portions of the recording, and storing the composite portion of the recording in a loop while analysis is performed on the audio portion of the recording.

10 Claims, 2 Drawing Sheets

5,870,708

METHOD OF AND APPARATUS FOR SCANNING FOR AND REPLACING WORDS ON VIDEO CASSETTES

BACKGROUND OF THE INVENTION

1. Field of Invention

This invention pertains to the art of methods and apparatuses for scanning video cassettes for objectionable material, and more specifically to methods and apparatuses for recognizing and removing objectionable speech from a video cassette during operation of a video cassette player.

2. Description of the Related Art

In the past, video cassette players have simply played backed movies and other videos in the manner in which they were recorded. Many videos feature language that parents may feel is not acceptable for children. Until now, there has been no method of screening these videos for objectionable language.

Applicant has recognized the need for an apparatus that screens objectionable language from videos that can be installed in a video cassette player.

The present invention contemplates a new and improved scanning method and apparatus which is simple in design, effective in use, and overcomes the foregoing difficulties and others while providing better and more advantageous overall results.

SUMMARY OF THE INVENTION

In accordance with the present invention, a new and improved method and apparatus for scanning for and replacing or muting objectionable language in videos are provided.

More particularly, in accordance with the present invention, the scanning apparatus for scanning associated media recording signals for objectionable audio signals includes an analyzation apparatus for analyzing the associated media recording signals and recognizing the objectionable audio signals. The scanning apparatus also includes a manipulation apparatus for manipulating the objectionable audio signals, the manipulation apparatus being operatively connected to the analyzation apparatus. The apparatus further includes a looping apparatus for storing the media recording signals while the analyzation apparatus analyzes the media recording signals and the manipulation apparatus manipulates the objectionable audio signals.

According to one aspect of the present invention, the scanning apparatus for scanning associated media recording signals for objectionable audio content, the associated media recording signals being comprised of an audio signal and a composite signal, the objectionable audio content being located within the audio signal, includes an amplifier for increasing the power of the associated media recording signals. The scanning apparatus also includes an audio decoder for separating the associated media recording signals into the audio signal and the composite signal that is connected to the amplifier, a looping apparatus for storing the composite signal for a fixed amount of time, an analyzation apparatus for analyzing the audio signal for the objectionable audio content, and a manipulation apparatus for manipulating the audio signal to remove the objectionable audio content.

According to another aspect of the present invention, the method of scanning a recording for objectionable content using a scanning apparatus includes the steps of analyzing the recording for objectionable content, and manipulating the objectionable content.

One advantage of the present invention is that the scanning apparatus mutes objectionable audio content such as profane language.

Another advantage of the present invention is that is may be installed in a video cassette player or recorder.

Another advantage of the present invention is that the visual portion of the recording is unaffected by the scanning analysis and audio manipulation.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
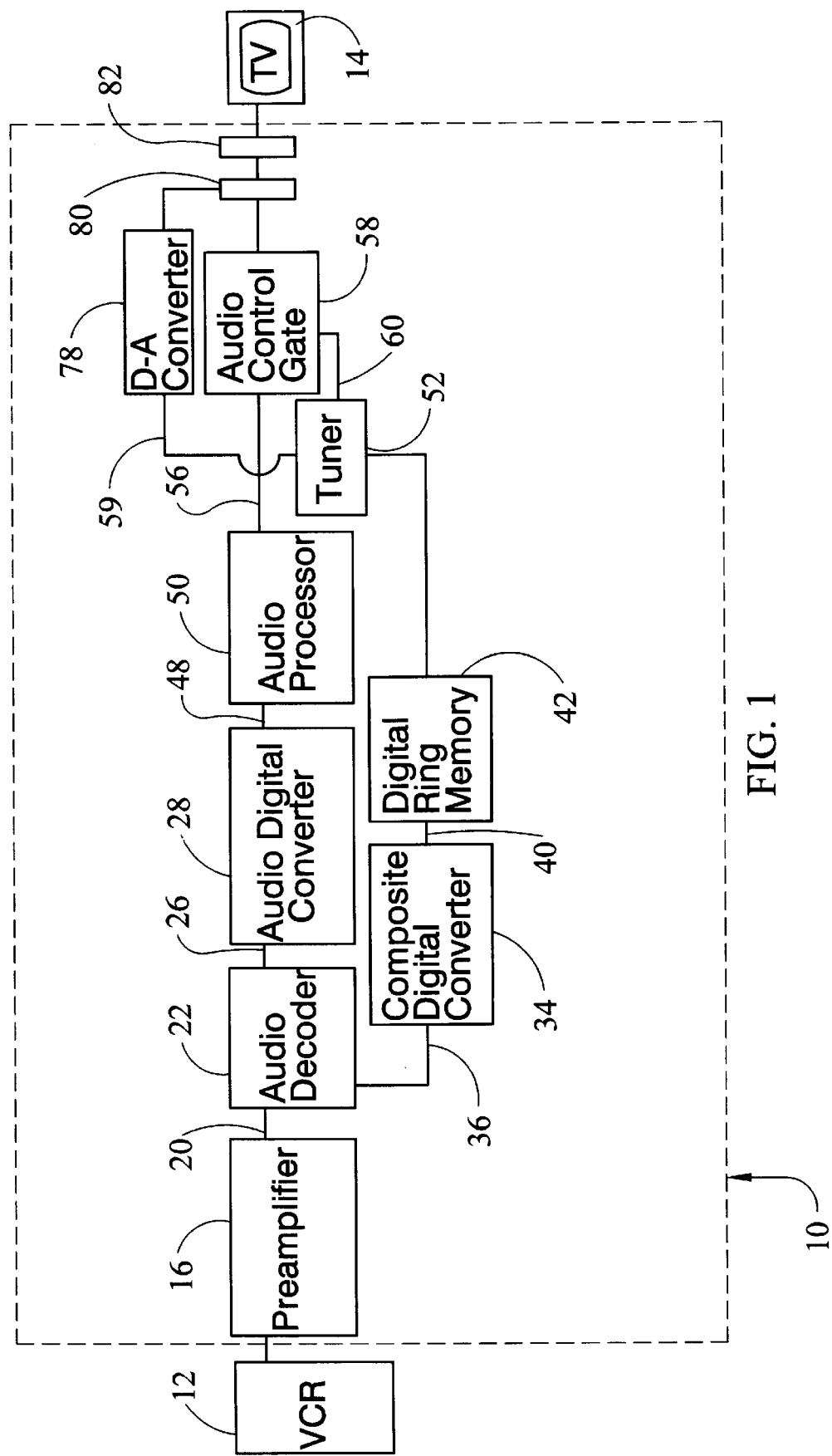
FIG. 1 is a schematic view of the scanning apparatus.

Referring now to the drawings wherein the showings are for purposes of illustrating a preferred embodiment of the invention only and not for purposes of limiting the same, FIG. 1 shows a schematic view of a scanning apparatus 10 to be added to a video cassette player 12 between the video cassette player and a television 14. A video cassette player 12, or a video cassette recorder (not shown), reads recording signals from a magnetized cassette tape and transmits those recording signals to the television 14 to be broadcast. The typical recording signals consist of composite video, audio, and control signals. The video signal provides the picture. The audio signal provides the soundtrack. The control signal covers timing and control information such as information that directs the picture tube where and when to write picture information on the screen of the television 14.

The scanning apparatus 10 is designed to remove objectionable material from the soundtrack by altering the audio signal.

The preferred embodiment of the scanning apparatus 10 features a preamplifier 16. The preamplifier 16 preferably has sufficient bandwidth to amplify the composite signals. The preamplifier 16 is preferred because it conditions the composite signals to working frequencies and increases the power of the composite signal to minimize injection of noise into the system. Noise injection is easier to minimize when the power of the composite signal is boosted. Preferably, a standard amplifier of the type typically used in television circuitry and well known by those skilled in the art may be employed as the preamplifier 16. The preferred amplifier is available from Phillips ECG and is sold under the trade name ECG 1265. A VHF amplifier such as the amplifier available from MCM Electronics and sold under the part number 35-1585 may also be employed as the preamplifier 16.

The composite signal from the preamplifier 16 is transmitted over wire 20 to an audio decoder 22. The audio decoder 22 separates the audio signal out of the composite signal. The audio decoder 22 beats the composite signal with a decoding frequency to trap the audio signal from the carrier centered frequency of the composite signal to the standard audio frequency in the range of 20 Hz to 20,000 Hz.

Beating the composite signal combines it with a fixed frequency signal and results in a third "beat signal." The audio signal is then decoded out by shifting the frequencies in the transmitted signal to the 20 Hz to 20,000 Hz working range. The audio decoder 22 is standard television circuitry well known to those skilled in the art. The preferred audio decoder 22 is available as part of a master chip from Phillips ECG and is sold under the trade name ECG 1863.

The audio signal is then preferably transmitted over wire 26 to an audio digital converter 28 that converts the audio signal from an analog signal to a digital signal. The audio signal must be digitized so that the scanning apparatus 10 may be analyzed. Standard analog to digital conversion techniques are preferably used to digitize the signal. The preferred digital converter 28 is available from Phillips ECG and is sold under the trade name ECG 2057.

The composite signal is preferably transmitted from audio decoder 22 to composite digital converter 34 over wire 36. The composite digital converter 34 converts the composite signal from an analog signal to a digital signal. Standard analog to digital conversion techniques are preferably used to digitize the signal. The preferred composite digital converter 34 is available from Phillips ECG and is sold under the trade name ECG 2057. Another digital converter 34 is available from Reveal Computer Products and is sold under model number VE500

After analog to digital conversion, the composite signal is transferred over wire 40 to digital looping apparatus such as digital ring memory 42. The digital composite signal is put into the digital ring memory 42 so that there will be time to analyze the audio signal and time to mute or modify objectionable speech. The composite signal preferably remains in the digital ring memory 42 for approximately ten seconds. The digital ring memory 42 is an electronic loop that is well known in the electronics industry. The preferred digital ring memory 42 is available from Phillips ECG and is sold under the trade name ECG 2128.

As the composite signal is stored in the digital ring memory 42, the audio signal beat out by the audio decoder 22 is transmitted over wire 48 from the audio digital converter 28 to an apparatus for analyzing the audio signal such as audio processor 50. The audio processor 50 is of the type commonly used in speech recognition packages such as those sold by Articulate Systems, Inc. under the trade name "PowerSecretary" and by Dragon Systems under the trade name "DragonDictate." The audio processor 50 performs analysis on the digital audio signal to determine which word or words should be muted or modified in the audio portion of the recording. The audio processor 50 scans for words by breaking up the speech into sections or bursts and analyzing the specific sections and the adjacent sections. The frequency and amplitude of the sections are matched against a set of templates stored in the memory of the audio processor 50. When the frequency and amplitude of one of the sections matches the template of the frequency and amplitude of a known objectionable word, the section is marked with a voltage as a word to be muted.

After the audio signal is analyzed by the audio processor 50, the audio processor sends a muting signal over wire 56 to a manipulation apparatus such as the audio control gate 58. The muting signal is a zero voltage signal except when the audio processor 50 determines a word is to be muted, when the muting signal is a negative five volts (−5 volts) signal. The composite signal is transferred from the digital ring memory 42 over wire 60 to the audio control gate 58 simultaneously with the corresponding muting signal from the audio processor 50. The preferred audio control gate 58 uses a transistor available from Phillips and is sold under the trade name ECG 123, and an audio amplifier integrated circuit such as the one available from Phillips and sold under the trade name ECG 1875 or the one available from Toshiba sold under the trade name Toshiba TOA2611A.

Figure 2:
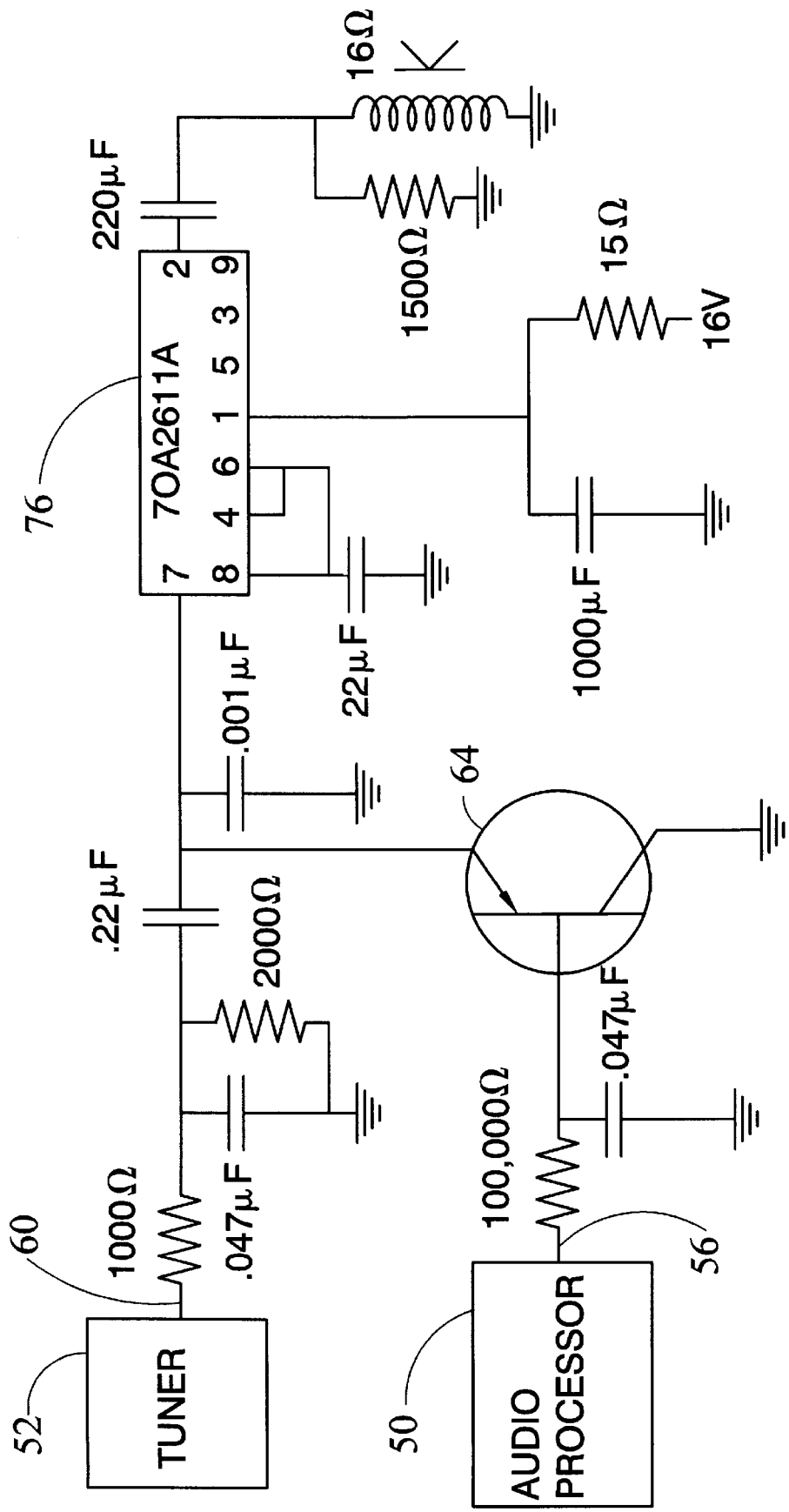
FIG. 2 is a schematic of an audio control gate.

A tuner 52 splits the audio signal from the composite signal. The composite signal passes over wire 59 to a digital to analog converter 78 and a remixer 80. FIG. 2 shows a detailed view of the audio control gate 58 which is recognizable to one skilled in the art. The audio signal passes over wire 60, and the muting signal from the audio processor 50 passes over wire 56. The preferred analog converter 78 is available from Phillips ECG and is sold under the trade name ECG 2057. The tuner 52 is one commonly used in the art of televisions and video cassette recorders.

With reference to FIGS. 1 and 2, the two wires 56,60 are operatively connected to a small signal PNP transistor 64 (see FIG. 2), such as an ECG123. When the muting signal is zero volts, the audio signal is allowed to pass the transistor 64 and is transmitted to the television 14. When the muting signal applies a voltage of negative five volts (−5 volts) to mute an objectionable word in the audio signal, the transistor 64 pulls the composite signal, thereby preventing the objectionable word from passing through the system. When the objectionable audio has passed, the muting signal is returned to zero volts (0 volts), and the transistor 64 will allow the audio signal to pass along to the speaker 70.

Between the transistor 64 and speaker 70 is an audio amplifier 76 that converts the composite signal back into analog form. The preferred audio amplifier 76 is available from Toshiba and is sold under the trade name Toshiba TOA2611A.

With continuing reference to FIG. 1, a remixer 78 mixes the audio signal back into the composite signal. Afterwards, a the composite signal is amplified by an amplifier 80, and then is processed through an RF converter 82 to channels 3 or 4. The amplifier 80 and RF converter 82 are well known to those skilled in the art. The preferred remixer 78 is made of two diodes and is a common component in any television set. The preferred amplifier 80 is available from Phillips and is sold under the trade name ECG 1265. The preferred RF converter 82 is available from Toshiba and is sold under the trade name Toshiba 70123095.

In an additional embodiment of the invention, the pulled down audio signal may be replaced by a non-objectionable word. The non-objectionable word is supplied from a memory of exchange audio. The original is scanned and a replacement audio is pulled from exchange audio memory as needed. The exchange audio memory is paired with possible objectionable material and replaces the objectionable material when the objectionable material is found. Duration and other sound characteristics may also be manipulated as necessary to match the timing of the objectionable material.

In another embodiment of the invention, the scanning apparatus may be fitted with an on/off switch so that the apparatus may be bypassed. Such a switch preferably would be coded so that anyone without the correct code could not turn the scanning apparatus 10 off.

The embodiments of the present invention need not be limited to video cassette recorders. The scanning apparatus may also be applied to other types of video players, such as a laser disk player, and audio equipment such as a compact disc player, audio cassette player, or other stereo equipment. The scanning apparatus may further be applied to video games, television, satellite or cable television, computers, and the Internet. In the situation when the video or audio is stored originally in a digital format, such as the case with laser disks of compact discs, the analog to digital converters 28,34 and the digital to analog converter 78 may be omitted from the scanning apparatus 10. The scanning apparatus 10 may be retrofitted to an existing video cassette player or recorder, or the scanning apparatus 10 may be installed in a new video cassette player or recorder.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A scanning apparatus for scanning associated media recording signals for objectionable audio signals comprising objectionable speech, said apparatus comprising:

analyzation means for analyzing said associated media recording signals and recognizing said objectionable audio signals;

manipulation means for manipulating said objectionable audio signals, said manipulation means being operatively connected to said analyzation means;

looping means for storing said media recording signals while said analyzation means analyzes said media recording signals and said manipulation means manipulates said objectionable audio signals; and, an amplifier for increasing the power of said associated media recording signals.

2. The scanning apparatus of claim 1 further comprising:

digitizing means for converting said associated media recording signals from an analog form to a digital form.

3. The scanning apparatus of claim 2 further comprising:

analog conversion means for converting said associated media recording signals from said digital form to said analog form after said manipulation means manipulates said objectionable audio signals.

4. The scanning apparatus of claim 1 further comprising:

an audio decoder, said audio decoder separating said associated media recording signals into an audio signal and a composite video, audio, and control signal, said objectionable audio signals being located in said audio signal.

5. The scanning apparatus of claim 4 further comprising:

audio digitizing means for converting said audio signal from an analog audio form to a digital audio form; and, composite digitizing means for converting said composite video, audio, and control signal from an analog composite form to a digital composite form.

6. The scanning apparatus of claim 4 further comprising:

analog audio conversion means for converting said audio signal from said digital audio form to said analog audio form after said manipulation means manipulates said objectionable audio signals; and, analog composite conversion means for converting said composite video, audio, and control signal from said digital composite form to said analog composite form.

7. A scanning apparatus for scanning associated media recording signals for objectionable speech, said associated media recording signals being comprised of an audio signal and a composite signal, said objectionable speech being located within said audio signal, said scanning apparatus comprising:

an amplifier for increasing the power of said associated media recording signals;

an audio decoder, said audio decoder separating said associated media recording signals into said audio signal and said composite signal, said audio decoder being connected to said amplifier;

looping means for storing said composite signal for a fixed amount of time;

analyzation means for analyzing said audio signal for said objectionable speech; and, manipulation means for manipulating said audio signal to remove said objectionable speech.

8. The scanning apparatus of claim 7 further comprising:

audio digitizing means for converting said audio signal from an analog audio form to a digital audio form before said audio signal is analyzed by said analyzation means; and, composite digitizing means for converting said composite signal from an analog composite form to a digital composite form before said composite signal is stored by said looping means.

9. The scanning apparatus of claim 7 further comprising:

audio analog means for converting said audio signal from a digital audio form to an analog audio form after said audio signal is analyzed by said analyzation means and manipulated by said manipulation means; and, composite analog means for converting said composite signal from a digital composite form to an audio composite form after said composite signal is stored by said looping means.

10. A method of scanning a recording for objectionable speech using a scanning apparatus, said method comprising the steps of:

amplifying said recording using an amplifier;

separating an audio portion of said recording from a composite portion of said recording;

digitizing said audio portion of said recording;

digitizing said composite portion of said recording;

delaying said composite portion of said recording in looping means;

analyzing said recording for objectionable speech; and, manipulating said audio portion of said recording.

* * * * *